(12) United States Patent
Feng et al.

(10) Patent No.: US 10,609,300 B2
(45) Date of Patent: Mar. 31, 2020

(54) IMAGE SENSOR, OPERATION METHOD THEREOF, AND IMAGING DEVICE

(71) Applicant: HUAIAN IMAGING DEVICE MANUFACTURER CORPORATION, Huaian, Jiangsu (CN)

(72) Inventors: Xinhe Feng, Jiangsu (CN); Shaw-Tzeng Hsia, Jiangsu (CN); Jianguang Chang, Jiangsu (CN); Yonggang Wang, Jiangsu (CN)

(73) Assignee: HUAIAN IMAGING DEVICE MANUFACTURER CORPORATION, Huaian (CN)

(*) Notice: Subject to any disclaimer, the term of this patent is extended or adjusted under 35 U.S.C. 154(b) by 0 days.

(21) Appl. No.: 16/009,908

(22) Filed: Jun. 15, 2018

(65) Prior Publication Data

US 2019/0104247 A1 Apr. 4, 2019

(30) Foreign Application Priority Data

Sep. 30, 2017 (CN) .......................... 2017 1 0914475

(51) Int. Cl.
*H04N 5/235* (2006.01)
*H04N 5/232* (2006.01)
(Continued)

(52) U.S. Cl.
CPC ......... *H04N 5/2357* (2013.01); *H04N 5/2254* (2013.01); *H04N 5/2351* (2013.01);
(Continued)

(58) Field of Classification Search
CPC .... H04N 5/2357; H04N 5/2254; H04N 5/378; H04N 5/2351; H04N 5/23245; H04N 5/2352
See application file for complete search history.

(56) References Cited

U.S. PATENT DOCUMENTS 9,667,883 B2 * 5/2017 Chang ................. G06K 9/2036
10,367,998 B2 * 7/2019 Nakata ............... H04N 5/23245
(Continued)

FOREIGN PATENT DOCUMENTS

CN 101582992 A 11/2009
CN 101923212 A * 12/2010
(Continued)

OTHER PUBLICATIONS

Office Action dated Feb. 19, 2019, in corresponding Chinese Application No. 201710914475.5 (with translation) (16 pages).
(Continued)

*Primary Examiner* — Shahbaz Nazrul
(74) *Attorney, Agent, or Firm* — Bookoff McAndrews, PLLC

(57) ABSTRACT

An image sensor comprises an image sensing array on a semiconductor substrate for image sensing. The image sensor comprises a plurality of first light sensing units arranged in an array. A light sensor, disposed on the semiconductor substrates for sensing ambient light and converting the ambient light into a first electrical signal comprises a plurality of second light sensing units arranged in an array. A processing module may be connected to one or more light sensing units and may be configured to determine the intensity of the ambient light based on the first electrical signal and control the operation of the image sensor based on the determined intensity.

20 Claims, 7 Drawing Sheets

(51) Int. Cl.
  *H04N 5/378* (2011.01)
  *H04N 5/225* (2006.01)
(52) U.S. Cl.
  CPC ....... *H04N 5/2352* (2013.01); *H04N 5/23245* (2013.01); *H04N 5/378* (2013.01)

(56) References Cited

U.S. PATENT DOCUMENTS

| | | | |
|---|---|---|---|
| 2009/0284615 A1 | 11/2009 | Chen | |
| 2011/0242359 A1* | 10/2011 | Lee | H04N 5/235 348/226.1 |
| 2012/0057046 A1 | 3/2012 | Tanaka | |
| 2013/0057713 A1* | 3/2013 | Khawand | H04N 5/232 348/208.1 |
| 2013/0297926 A1* | 11/2013 | Eaton | H04M 1/72569 713/100 |
| 2014/0166853 A1 | 6/2014 | Chuang et al. | |
| 2014/0168372 A1* | 6/2014 | Chang | H04N 5/332 348/46 |
| 2015/0092019 A1* | 4/2015 | Asano | G01C 3/085 348/46 |
| 2015/0177865 A1* | 6/2015 | Rodzevski | G06F 3/042 345/175 |
| 2015/0358567 A1* | 12/2015 | Sargent | H04N 5/361 348/164 |
| 2018/0315788 A1* | 11/2018 | Kuo | H01L 27/14623 |

FOREIGN PATENT DOCUMENTS

| | | |
|---|---|---|
| CN | 101923212 A | 12/2010 |
| CN | 102595030 A | 7/2012 |
| CN | 103869973 A | 6/2014 |
| CN | 206465845 U | 9/2017 |

OTHER PUBLICATIONS

Office Action dated May 28, 2019, in corresponding Chinese Application No. 201710914475.5 (with translation) (15 pages).

* cited by examiner

IMAGE SENSOR, OPERATION METHOD THEREOF, AND IMAGING DEVICE

CROSS REFERENCE TO THE RELATED APPLICATION

The present application claims priority to the CN application No. 201710914475.5 filed on Sep. 30, 2017, which is incorporated herein by reference in its entirety.

FIELD

The present disclosure relates to an image sensor, an operation method for image sensor, and an imaging device.

BACKGROUND

In recent years, with the continuous improvement of semiconductor design and manufacturing technology, image sensor chips are developed with more integrations and diversifications, in purpose of achieving more abundant functions and superior image sensing performance while ensuring ease of the implementation.

CMOS image sensor chip is a type of sensor chip that uses an active pixel sensing unit/element and is widely used in cameras, camera equipment, and the like because of its low power consumption and high operating speed.

FIG. 1 shows a conventional image forming apparatus (or system). The imaging device includes a CMOS image sensor chip 10 and a microcontroller unit (MCU)/image signal processor (ISP) chip 12. Both can be set on a printed circuit board (PCB). The CMOS image sensor chip 10 may sense image(s) and provide image signals to the MCU/ISP chip 12 for processing. The MCU/ISP chip 12 may control the entire system as a main controller of the system; therefore, the MCU/ISP chip 12 may also sometimes be referred to as a host computer chip of the CMOS image sensor chip 10.

The MCU/ISP chip 12 may receive the image signal transmitted from the CMOS image sensor chip 10 to perform image signal processing and provide the image to the display 18 for display. The MCU/ISP chip 12 may also send a control signal to the CMOS image sensor chip 10. The MCU/ISP chip 12 can also control other various drivers 16.

The imaging system may also include a photo-resistor 14 to detect ambient light. The MCU/ISP chip 12 can switch an infrared filter (IR-CUT) 20 according to the signal provided by the photo-resistor 14, and control the CMOS image sensor chip 10 so that the imaging system can switch between a color image mode and a black-and-white image mode. At the same time, the MCU/ISP chip 12 controls the light source (e.g., LED) 22 to compensate the light to improve the imaging quality.

For the system, additional discrete component for detecting light intensity (such as the photo-resistor CdS) and related board-level circuits to assist in the operation of the discrete components are incorporated, which leads to increased manufacturing costs and increased power consumption, and may bring about additional costs due to differentiations and complications of the system.

On the other hand, flicker of ambient light (e.g., flicker of light caused by utility-provided electric power at a frequency of 50 Hz/60 Hz, etc.) adversely affects the imaging quality. Although such flicker may be not a problem for the human eyes, it poses problems for the imaging of the image sensors, for example, rendering ripples in the formed images. In the prior art, a method of analyzing image data collected by a CMOS image sensor chip is generally used to detect the flicker. However, a disadvantage of such a conventional method is that it requires multiple frames of data for evaluation, and the amount of data to be processed is very huge, which greatly increases the workload of the host MCU/ISP chip, and also leads to more resource consumption. With the increase of the resolution of the image sensor chip, the amount of data to be processed in detecting of the flicker of the ambient light using the conventional method also increases significantly, thus the disadvantages of the conventional method becomes even more serious. In addition, the exposure time of the image sensing unit of the image sensor chip may be changed time to time, increasing the difficulty and complexity of the flicker detection.

Although in some chips of the prior art, the flicker detection function is integrated into the CMOS image sensor chip, the methods are basically similar, and multi-frames of data need to be processed. And thus, the foregoing problem(s) still exist. Such integration means that the circuit design is more complex and the overall cost is increased while the chip area is increased.

In addition, for ambient light intensity and ambient light flicker, the detections thereof are generally independent in conventional imaging systems, and the detections relying more on board-level discrete devices and host computer chips to achieve such functionalities. This may lead to inefficiency and high cost of detection.

Therefore, there is a need for improved image sensors and imaging devices.

SUMMARY

One of the objectives of the embodiments of the present disclosure is to provide an image sensor, an operating method thereof, and an imaging device which are improved.

The image sensor according to embodiments of the present disclosure has a novel structure, and can more efficiently detect ambient light intensity and detect light flicker, such as light flicker caused by alternating power, etc.

Some embodiments of the present disclosure can also provide an interface to external light sensors so as to provide design flexibility.

According to the embodiments of the present disclosure, a simplified imaging system can be provided, and the requirement for the processing capability of the image sensor can be reduced, and chip area will not be significantly increased. As a result, the system cost can be reduced, the detection efficiency can be improved, the processing method can be simplified, and more efficient and accurate detection results can be obtained.

According to an aspect of the present disclosure, there is provided an image sensor comprising: an image sensing array on a semiconductor substrate for performing image sensing, the image sensing array comprising a plurality of first light sensing units arranged in an array; a first light sensor on the substrate for sensing ambient light and converting the ambient light to a first electrical signal, the first light sensor comprising a plurality of second light sensing units arranged in an array, the second light sensing unit being positioned external to the array of the first light sensing units; and a processing module configured to determine an intensity of the ambient light based on the first electrical signal and control an operation of the image sensor based on the determined intensity.

In an embodiment, the image sensor may further comprise an interface for receiving a second electrical signal from an externally connected second light sensor, wherein the processing module is configured to determine the intensity of ambient light based on the first electrical signal and the second electrical signal.

In an embodiment, the processing module may comprise a digital-to-analog converter (ADC) for converting the electrical signal(s) into digital signal(s) for determining the intensity of ambient light.

In an embodiment, the processing module may comprise an image signal processing module (ISP) for processing image signals sensed by the image sensing array.

In an embodiment, controlling the operation of the image sensor may comprise: when the intensity is less than or equal to a threshold, the processing module processes the image signals sensed by the image sensing array in a black-and-white mode; and, when the intensity is above the threshold, the processing module processes the image signals sensed by the image sensing array in a color mode.

In an embodiment, controlling the operation of the image sensor may comprise one or more of the following: the processing module turns off or turns on an infrared filter (IR-CUT) through a first control signal on basis of the intensity; the processing module turns on/off an external light source for performing light compensation through a second control signal on basis of the intensity; and adjusting an exposure time of the image sensing array by use of automatic exposure control on basis of the intensity.

In an embodiment, the second sensing unit may be configured to have a light sensing capability higher than the light sensing capability of the first sensing unit.

In an embodiment, a color filter may be further provided over the first sensing unit, and no color filter is provided over the second sensing unit.

In an embodiment, the processing module may comprise a flicker detector configured to determine flicker of the ambient light based on the first electrical signal.

In an embodiment, a sampling frequency of the first light sensor may be set to enable detection of a flicker of the ambient light in a target environment.

In an embodiment, the processing module may be further configured to adjust the exposure time of the image sensing array by automatic exposure control based on the determined flicker.

In an embodiment, the first light sensor may be disposed on the substrate within an imaging range of an optical member that cooperates with the image sensor. The image sensor may further comprise a first micro-lens on the first light sensing unit and a second microlens on the second light sensing unit. The second microlens may be shifted according to the position of the first light sensor in the imaging range such that light incident to the second light sensor unit is converged to a light-sensing element in the second light sensor unit.

According to another aspect of the present disclosure, there is provided an operation method for an image sensor. The image sensor may comprise an image sensing array on a semiconductor substrate for image sensing, the image sensing array comprising a plurality of first light sensing units arranged in an array; a first light sensor on the substrate, the first light sensor comprising a plurality of second light-sensing units arranged in an array, the second light-sensing units being positioned external to the array of the first light-sensing units. The method may comprise: with the first light sensor, sensing ambient light and converting the ambient light into a first electrical signal; determining an intensity of the ambient light based on the first electrical signal; and controlling an operation of the image sensor based on the determined intensity.

In an embodiment, the image sensor may further comprise: an interface for receiving a second electrical signal from an externally connected second light sensor.

In an embodiment, the method may further comprise determining the intensity of ambient light based on the first electrical signal and the second electrical signal.

In an embodiment, controlling the operation of the image sensor may comprise: processing image signals sensed by the image sensing array in black-and-white mode when the intensity is less than or equal to a threshold; and, when the intensity is higher than a threshold, processing the image signals sensed by the image sensing array in color mode.

In an embodiment, controlling the operation of the image sensor may comprise one or more of the following: turning off/on an infrared filter on basis of the intensity; turning on/off an external light source for light compensation on basis of the intensity; and adjusting an exposure time of the image sensing array by automatic exposure control.

In an embodiment, the light sensing capability of the second sensing unit may be higher than the light sensing capability of the first sensing unit.

In an embodiment, a color filter may be formed over the first sensing unit, and no color filter is formed over the second sensing unit.

In an embodiment, the method may further comprise: determining a flicker of the ambient light based on the first electrical signal; and adjusting an exposure time of the image sensing array by an automatic exposure control based on the determined flicker.

In an embodiment, the sampling frequency of the first light sensor may be set to enable detection of flicker of ambient light in a target environment.

In an embodiment, the first light sensor may be disposed on the substrate within an imaging range of a lens that cooperates with the image sensor. The image sensor may further comprise a first microlens over the first light sensing unit and a second microlens over the second light sensing unit. The second microlens may be shifted according to a position of the first light sensor in the imaging range such that light incident to the second light sensor unit is converged to a light-sensing element in the second light sensor unit.

According to still another aspect of the present disclosure, there is provided an imaging device comprising: an optical member, and an image sensor as described above for sensing light passing through the optical member.

BRIEF DESCRIPTION OF THE DRAWINGS

The accompanying drawings, which constitute part of this specification, describe exemplary embodiments of the present disclosure and, together with the description, serve to explain the principles of the invention, in which.

Figure 1:
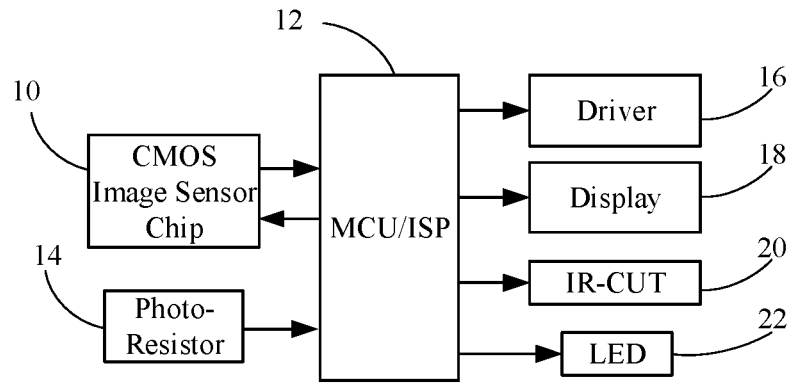
FIG. 1 shows a schematic block diagram of a conventional imaging system.

Note that sometimes the like reference numerals are used in the embodiments described below to denote the like portions or portions having the like functions throughout different drawings, and repeated descriptions thereof are omitted. In the specification, like numerals and letters are used to indicate like items, and therefore, once an item is defined in one figure, it need not be further discussed in subsequent figures.

For ease of understanding, the positions, sizes, and ranges of the respective structures shown in the drawings and the like do not necessarily indicate actual positions, sizes, and ranges. Therefore, the disclosed invention shall not be limited to the positions, dimensions, and ranges disclosed in the drawings and the like.

DETAILED DESCRIPTION

Specific embodiments of the present disclosure will be described in detail below with reference to the accompanying drawings. It should be noted that the descriptions of the embodiments are merely illustrative and are not intended to limit the invention in any sense. Unless specifically stated otherwise or the context or the principle thereof expresses or implies otherwise, the inventions shall not be limited by the relative arrangements, expressions, numerical values, and the like of components and. In this specification, techniques, methods, and devices known to one of ordinary skill in the art may be not discussed in detail, but the techniques, methods and devices should be considered parts of the specification where appropriate.

The terminology used herein is for the purpose of describing the embodiments only and is not intended to limit the disclosure. It will be understood that when the term "comprises/comprising" is used herein, it is intended that there be a stated feature, integer, step, operation, element, and/or component, but does not preclude the presence or addition of one or more other features, integers, steps, operations, units and/or components and/or combinations thereof.

The terms "before", "back", "top", "bottom", "above", "below" and the like in the description and the claims, if any, are used for descriptive purposes and not necessarily used to describe the constant relative position. It is to be understood that the terms so used are interchangeable when appropriate such that the embodiments of the invention described herein are, for example, capable of being implemented in other orientations than those illustrated or otherwise described herein.

In the present disclosure, the terms "provide/providing" or its variations are used in a broad sense to cover all ways of obtaining an object, so "providing an object" includes, but is not limited to, "purchasing", "preparing/manufacturing", "disposing/setting", "installing/assembling", and/or "ordering" objects, etc.

In the present disclosure, ordinal numbers such as "first", "second", "third", and the like are marked in order to avoid confusion of constituent elements and are not used to indicate any order of priority.

In the following, some embodiments of the present disclosure are sometimes described using CMOS image sensor chip as example, but the present disclosure shall not be limited thereto.

Figure 2:
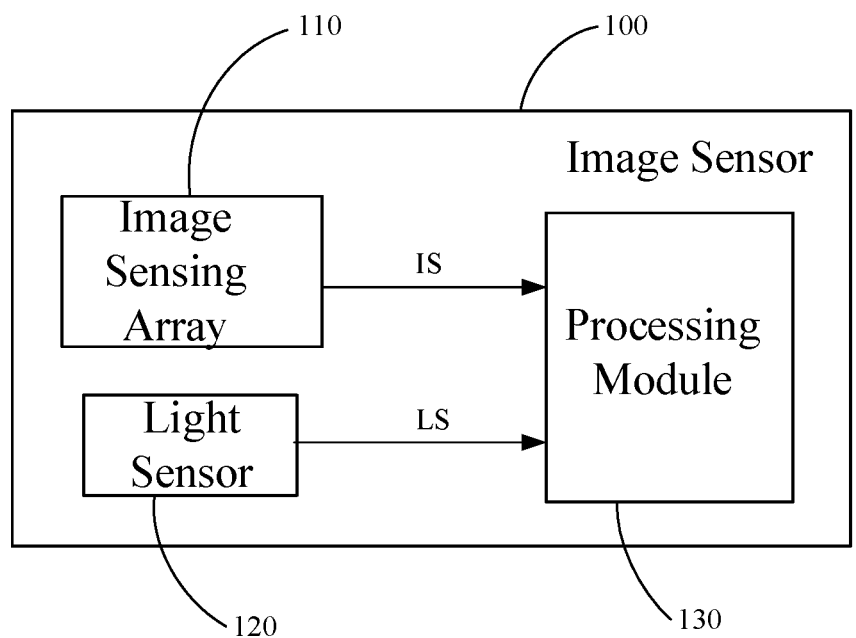
FIG. 2 shows a schematic block diagram of an image sensor according to an embodiment of the present disclosure.

FIG. 2 shows a schematic diagram of an image sensor according to an embodiment of the present disclosure. As shown in FIG. 2, the image sensor 100 may include an image sensing array 110, a light sensor 120, and a processing module 130. The image sensing array 110 may be used to sense an image and convert the sensed image into an image signal IS. The light sensor 120 may be used to sense ambient light and convert the sensed intensity of ambient light into an electrical signal (first electrical signal) LS. The processing module 130 may be configured to determine the ambient light intensity based on the electrical signal output by the light sensor 120 and control the operation of the image sensor based on the determined intensity.

The image sensing array 110 may be formed or positioned on a semiconductor substrate. The image sensing array 110 may include a plurality of light sensing units (for example, a photosensitive element (photodiode) or a pixel unit including a photosensitive element) arranged in an array. Here, the term "light" includes, but is not limited to, visible light, infrared light, ultraviolet light, etc. Image sensing array 110 may also include circuitry associated with the array of light sensing units.

Figure 3:
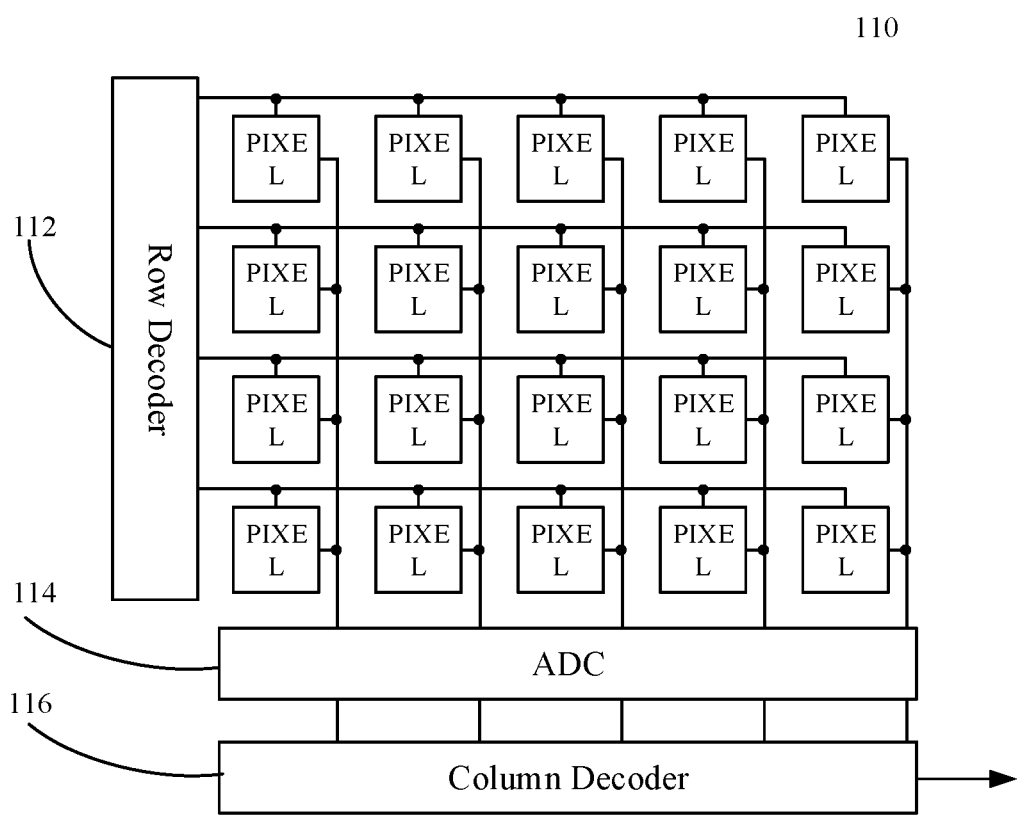
FIG. 3 shows a schematic diagram of an image sensing array according to an embodiment of the present disclosure.

FIG. 3 illustrates an implementation of an image sensing array according to an embodiment of the present disclosure, wherein the light sensing units are represented by pixel units PIXEL. As shown in FIG. 3, the image sensing array 110 includes a plurality of pixel units arranged in an array. The image sensing array 110 includes a row decoder 112 for row selection, which is disposed at a side of the pixel cell array, and a column decoder 116 for column selection disposed on the other side of the pixel cell array. The image sensing array 110 may also include an analog to digital converter ADC 114 for converting analog signals into digital signals.

When the image sensing array 110 is in operation, the pixel array including the plurality of pixel units, PIXEL, converts the light incident on the array through the lens into electrical signal (image signal). The manners in which the image sensing array 110 operates may be various. As an example, the pixels in a certain row may be selected by the column decoder 116, and the electrical signal formed by the pixel in the selected column may be input to the analog to digital converter 114 for conversion from an analog signal to a digital signal. The digital signals corresponding to each pixel (PIXEL) in the selected row may be output one by one through the column decoder 116.

It should be noted that the structure shown in FIG. 3 is merely exemplary and is not intended to limit the scope of the invention. The arrangements of the image sensing arrays of the image sensors according to various embodiments of the present disclosure shall not be limited that shown in FIG. 3, but may adopt any suitable arrangements, and may include any suitable associated circuitry and any number of light sensing units.

In addition, the arrangement and connection relationship of the ADC 114 and the column decoder 116 are also merely illustrative and not restrictive.

Returning to FIG. 2, the light sensor 120 may be disposed on the same substrate as the image sensing array 110. The light sensor 120 may include a plurality of light sensing units (e.g., pixel units) to sense ambient light. The plurality of light sensing units of the light sensor 120 may be arranged in an array, for example, in an array size of 1*10 or 2*10. This can ensure sufficient light information collection and make the determination result more accurate.

The light sensing units of the light sensor 120 can be positioned outside the array of the first light sensing units. In the layout design, the light sensor 120 can be disposed as close to the image sensing array 110 as possible where the overall performance of the image sensing array 110 is not affected, so as to ensure that sufficient light information can be collected.

Figure 4:
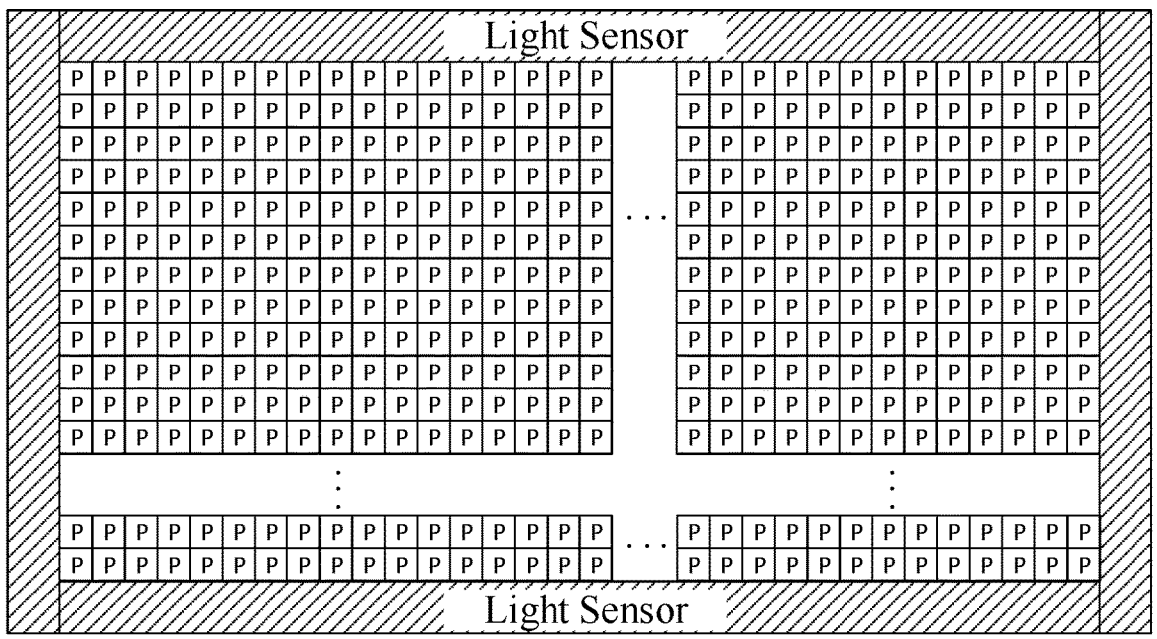
FIG. 4 shows a schematic diagram of layout positions of a light sensor according to an embodiment of the present disclosure.

FIG. 4 shows a schematic layout position of a light sensor according to an embodiment of the present disclosure. As shown in FIG. 4, the light sensor may be disposed at the periphery of a pixel array composed of a plurality of pixels P, for example, at one side or at a plurality of sides of the pixel array. As shown in FIG. 4, the light sensor may be arranged as surrounding the pixel array.

Figure 5:
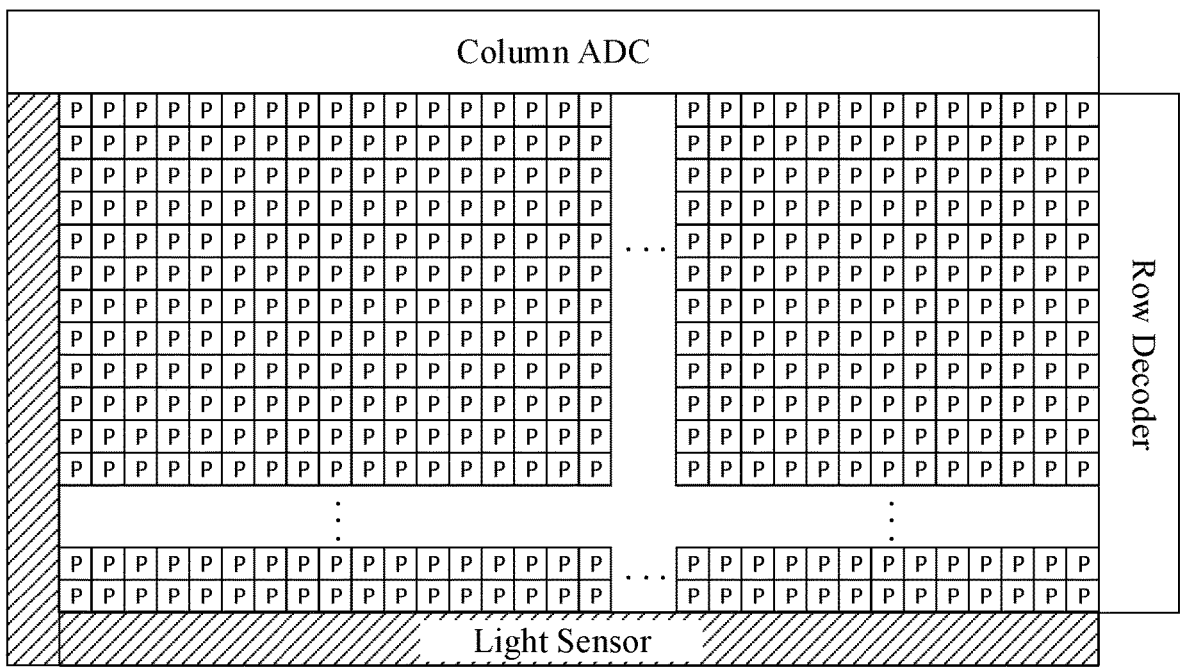
FIG. 5 shows a schematic diagram of layout locations of a light sensor according to another embodiment of the present disclosure.

In a design of the image sensor in practice, an analog sampling circuit or an analog-to-digital conversion module (or circuit) may be disposed near the image sensing array, and a horizontal decoder and a row signal driving circuit may be disposed in the horizontal direction. FIG. 5 shows the layout position of the light sensor that can be used in that case. As shown in FIG. 5, the row decoder and the column ADC are arranged on two sides of the pixel array which is illustrated as a rectangle in FIG. 5 and the light sensors can be arranged on the other two sides of the rectangular pixel array.

Figure 12A:
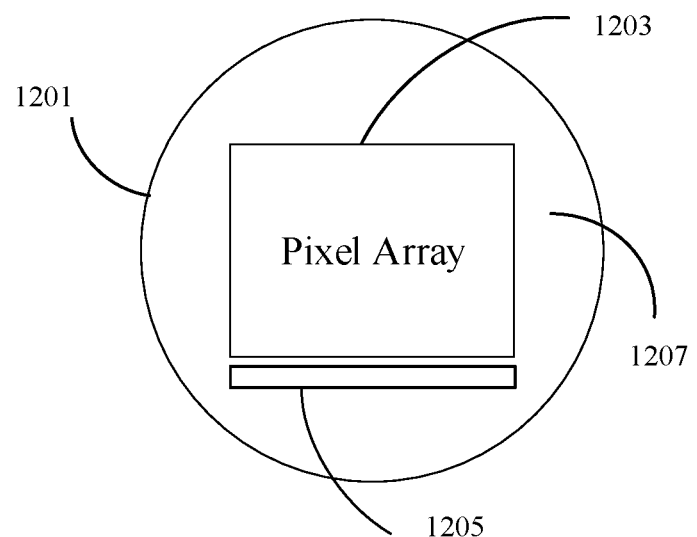
FIGS. 12A and 12B illustrate schematic views of the arrangement of an image sensor in an imaging device according to an embodiment of the present disclosure.

Although FIGS. 4 and 5 show some possible placement positions of the light sensor in the chip layout, the arrangement position of the light sensor according to the embodiments of the invention in the image sensor chip shall not be limited thereto. The light sensor 120 may be arranged in any suitable location that can ensure the light sensor collects sufficient ambient light information. For example, the light sensor 120 may be placed close to the image sensing array, or may be placed in a circuit area away from the image sensing array. In some embodiments, the light sensor 120 may only be required to be placed within the imaging range (also referred to as a light field) of an optical member (for example, a lens) that cooperates with the image sensor (as shown in FIG. 12A).

In general, the arrangement position of the light sensor 120 in the layout is very flexible, and can be selected and adjusted by the designer according to the specific conditions of the chip, to achieve a better layout while ensuring the performance of the light sensor 120.

In addition, preferably, the light sensing capability of the light sensing unit of the light sensor 120 is set higher than the light sensing capability of the light sensing unit of the image sensing array 110, to enhance the sensitivity and dynamic range of ambient light detection. The parameters that characterize the light sensing capability of the light sensing unit can be of various kinds. Typically, the light sensing capability of the light sensing unit can be characterized as an ability of the light sensing unit to convert light into electrical signals. For example, a light sensing unit having a high photoelectric conversion efficiency has a higher light sensing capability than a light sensing unit having a low photoelectric conversion efficiency. In general, for illuminations of the same intensity and the same intensity, a sensing unit capable of receiving more light can be considered to have a higher sensing capability than a sensing unit capable of receiving less light, assume that other conditions are kept same.

Preferably, the effective size of the light sensing unit of the light sensor 120 can be designed to be larger than the light sensing unit of the image sensing array 110 or be designed to be sufficiently large (e.g., several times than the latter) to ensure acquisition of sufficient light information.

In addition, as described above, the light sensor 120 is generally placed in the periphery of the image sensing array and is therefore located far from the main optical axis of the lens, that is, located at a position adjacent to the circumference in the imaging range of the lens. In such a case, lens shifting may be performed to adjust the micro lens to increase the amount of light received by the light sensor 120. Specifically, the specific parameters for lens shifting can be set according to the chief ray angle (CRA) parameter of the lens used.

Additionally or alternatively, a light-shielding layer is not disposed or formed over the light sensor and/or a color filter array is not disposed or formed over the light sensor, according to an embodiment of the present disclosure, so that the light sensor for collecting ambient light can collect light information more or more sufficiently.

In some embodiments, the light sensing unit of the light sensor 120 and the light sensing unit of the image sensing array 110 may be the same or different. When light sensing units of both of the light sensor 120 and the image sensing array 110 have the same or similar structure, the complexity of the design can be reduced. When different structures of the light sensing units are employed for both of the light sensor 120 and the image sensing array 110, it can bring out flexible configuration and better performance. By optimizing the performance of the light sensing units of the light sensor 120, especially the sensitivity and the dynamic range, it can be ensured that the light sensor 120 can obtain effective data information in a relatively large illumination range.

Although the pixels in the image sensing array are denoted by P in FIGS. 4 and 5, it should be understood that the pixels in the image sensing array may be used to sense light of different colors. In some embodiments, the structures of the pixels in the image sensing array may be the same, but different color filters may be formed on the pixels, such as red, green, or blue color filters, so that the pixels can be used to sense light of different colors, respectively. Pixels in the image sensing array may be grouped in different patterns. For example, each pattern (or, each pixel group) may include two pixels for sensing green light and one pixel for sensing red light and one pixel for sensing blue light. The manners for grouping the pattern or the group of pixels can be varied. For the light sensing unit of the light sensor 120, a color filter may be not provided. In such a way, the light sensing capability can be increased, and the structure of the light sensing unit can be simplified.

In addition, micro-lenses may also be provided on the pixels to concentrate the light onto the photosensitive elements of the pixels. In an embodiment of the present disclosure, micro lenses may also be provided on the pixels of the light sensor.

In some implementations, considering the position of the light sensor in the imaging range, the micro-lenses disposed over the pixels of the light sensor can be adjusted so as to improve the entering of light into the pixels. For example, because the light sensor is placed outside the image sensing array (e.g., at a distance away from the image sensing array), the incident angle of some of the light incident on the light sensor has a certain difference relative to the incident angle of the light incident on the image sensing array. Generally, microlenses are tuned based on the requirements of the pixels of the image sensing array to receive light. Therefore, in such a case, the difference in the angles of the two kinds of incident light may cause the light incident on the pixels of the light sensor not to be completely converged to the light sensing element in the pixel, so that a part (maybe a small part) of ambient light is not collected, which may reduce the accuracy and sensitivity of the sensing. In this case, the present disclosure also contemplates shifting the micro-lenses on the pixels of the light sensor so that the light is converged or better converged to the light-sensing elements, such as photodiodes, of the pixels of the light sensor.

Figure 6:
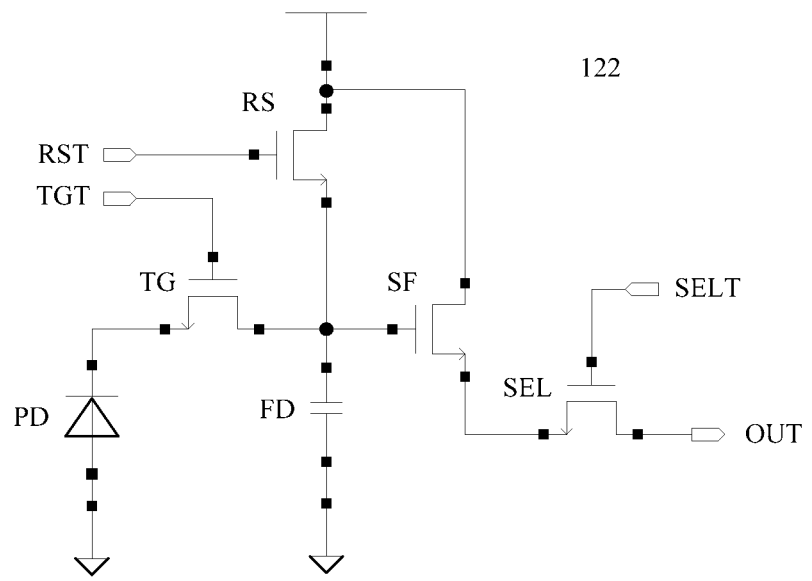
FIG. 6 shows a circuit diagram of a photo-sensing unit of a light sensor according to an embodiment of the present disclosure.

FIG. 6 shows a circuit diagram of a light-sensing unit of a light sensor according to an embodiment of the present disclosure. The light sensing unit 122 of the light sensor 120 is an active pixel sensor employing a 4T (4-transistors) structure. It should be noted that the structure of the light sensing unit employed by the light sensor according to the embodiments of the present disclosure is not limited thereto, and any known and suitable structure for light sensing unit may be employed.

As shown in FIG. 6, the light sensing unit 122 includes a transfer transistor TG, a reset transistor RS, a source follower transistor SF, a select transistor SEL, a capacitor FD, and a photosensitive element (for example, photodiode) PD. In the example shown in FIG. 6, the four transistors TG, RS, SF, and SEL are all shown as N-type transistors. The gate of the reset transistor RS is connected to a reset input RST, the drain thereof is connected to a power supply VDD, and the source thereof is connected to one electrode plate of the capacitor FD. The other electrode plate of the capacitor FD is connected to ground. The gate of the transfer transistor TG is connected to a transmission control input TGT, the drain thereof is connected to the source of the reset transistor RS, and the source thereof is connected to the cathode of the photodiode PD. The anode of the photodiode PD is connected to ground. The gate of the source follower transistor SF is also connected to the source of the reset transistor RS, the drain thereof is connected to the supply voltage VDD, and the source thereof is connected to the source of the select transistor SEL. The gate of the select transistor SEL is connected to a select input SELT, and the drain thereof is connected to a sense signal output OUT.

Returning again to FIG. 2, the processing module 130 may be placed on the same substrate as the image sensing array 110 and the light sensor 120. However, the present disclosure is not limited to this. The processing module 130 may determine the intensity of the ambient light based on the signal LS, and control the operation of the image sensor based on the determined intensity. For example, when the determined light intensity is less than or equal to a threshold, the processing module 130 may control the image sensor 100 to process the image signal IS sensed by the image sensing array 110 in a black-and-white mode. Whereas, when the intensity is higher than the threshold, the processing module 130 may control the image sensor 100 to process the image signal sensed by the image sensing array 110 in a color mode. In some embodiments, the threshold may be set by configuring a register.

For example, in the case where the ambient light intensity is less than or equal to the threshold, the processing module 130 may control to turn off the infrared cutoff such that the image sensing array also receives infrared information and senses and presents the image in a so-called "black-and-white mode" (as will be explained in more detail later), thereby enhancing the overall reception of information.

Figure 7:
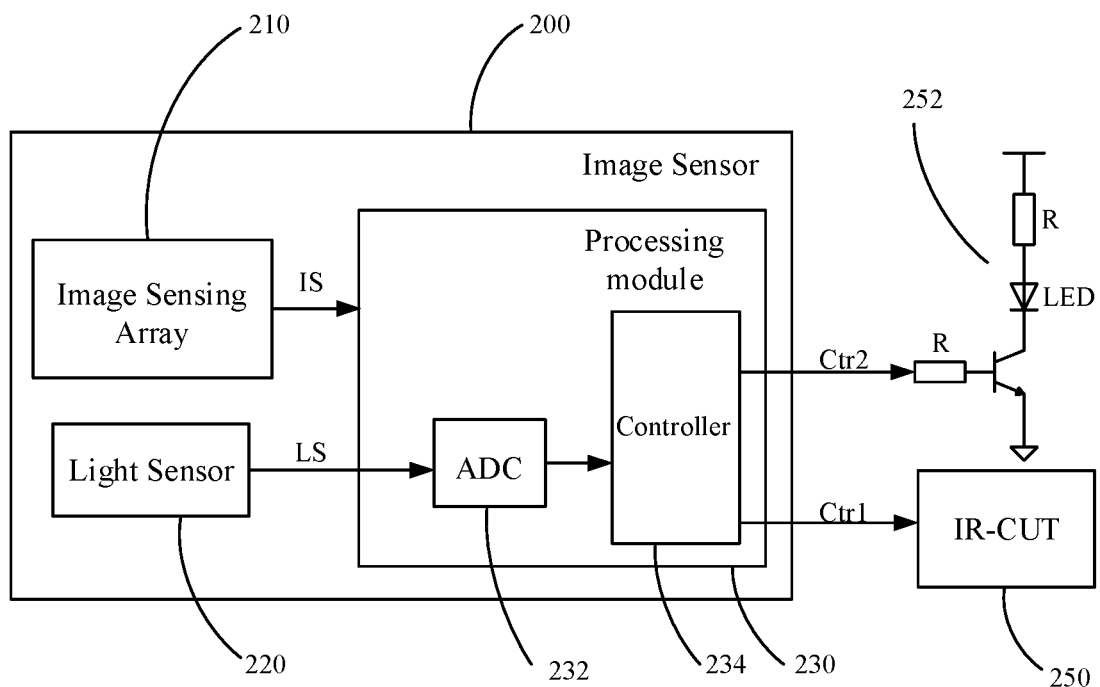
FIG. 7 shows a schematic diagram of an image sensor according to an embodiment of the present disclosure.

FIG. 7 shows a schematic diagram of an image sensor according to another embodiment of the present disclosure. In order to simplify the description, in the following description of various embodiments according to the present disclosure, only the differences between the respective embodiments will be described in detail, and repeated explanation of the same or similar portions of the embodiments will be omitted.

As shown in FIG. 7, the image sensor 200 includes an image sensing array 210, a light sensor 220, and a processing module 230. The image sensing array 210 and the light sensor 220 are similar to the corresponding components of the image sensor 100 shown in FIG. 2, and therefore are omitted from being described in detail.

The processing module 230 of the image sensor 200 is configured to determine the ambient light intensity based on the electrical signal LS received from the light sensor 220, and control the operation of the image sensor 200 based on the result of the determination of the ambient light intensity. The processing module 230 includes a digital-to-analog converter (ADC) 232 and a controller (or control section) 234. The ADC 232 converts the electrical signal LS from the light sensor 220 into a digital signal. The controller 234 determines the intensity of the ambient light based on the digital signal, and outputs a control signal Ctrl based on the determination result to control the external infrared filter 250 (e.g., an external filter) to be enabled (i.e., turned on) or disabled (i.e., turned off).

For example, when it is determined that the ambient light intensity is less than or equal to the threshold, which means that the ambient light around the image sensor 200 is dark (for example, when it is working at night), the controller 234 of the processing module 230 outputs the control signal Ctrl to turn off the infrared filter 250 so that the image sensing array 210 receives infrared light to image in a black-and-white image mode so as to improve image quality. When determining that the ambient light intensity is greater than the threshold, which means that ambient light around the image sensor 200 is sufficient (for example, when it is working in daylight hours), the infrared light interferes with color image imaging, thus the infrared filter 250 is turned on to shield the infrared light in such a case.

The controller 234 of the processing module 230 may also output a control signal Ctr2 based on the determined light intensity, to control the external light source 252 to be turned off or on. For example, when it is determined that the ambient light intensity is less than or equal to the threshold, which means that the ambient light around the image sensor 200 is dark at this time (for example, when it is working at night), the external light source 252 (for example, LED) is turned on to compensate the light so as to improve the imaging. When determining that the ambient light intensity is greater than the threshold, which means that the ambient light around the image sensor is sufficient (for example, during daylight hours), the external light source 252 for light compensation is turned off to reduce unnecessary power consumption. In FIG. 7, a light source including a switch, a resistor R, and an LED is shown as an example of the light source 252. It should be understood that there is no particular limitation on the light source.

It should also be noted that although the controller (control section) is shown to perform the related control in FIG. 7 and some of the figures below, it should be understood that the controller may also perform other controls or processes such as image information processing and the like.

Figure 8:
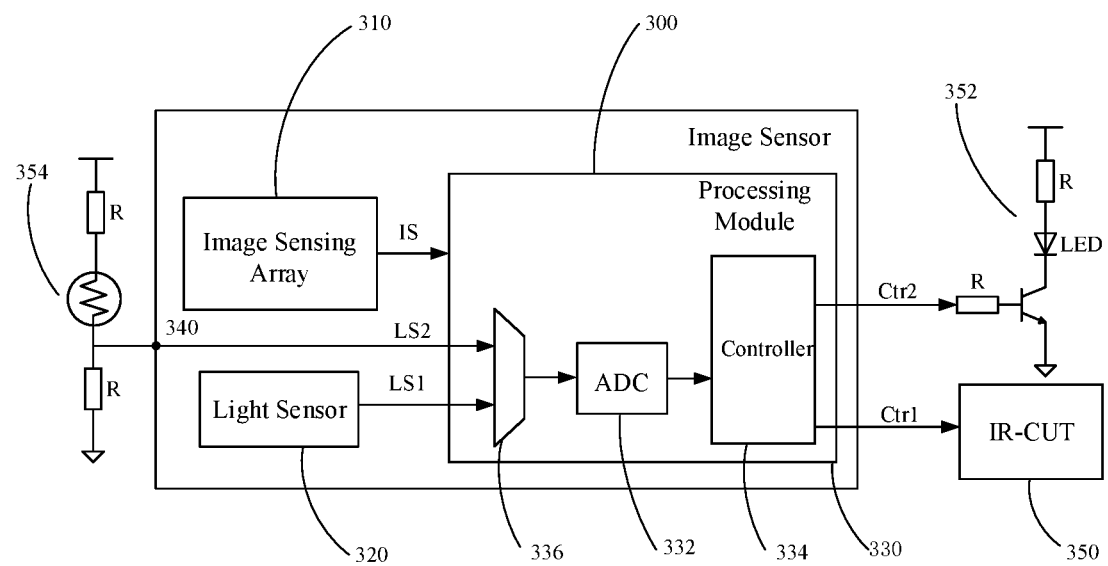
FIG. 8 shows a schematic diagram of an image sensor according to an embodiment of the present disclosure.

FIG. 8 shows a schematic diagram of an image sensor 300 according to an embodiment of the present disclosure.

As shown in FIG. 8, the image sensor 300 includes an image sensing array 310, a light sensor 320, a processing module 330, and an interface 340. The image sensing array 310 and the light sensor 320 are similar to the corresponding components of the image sensor 100 shown in FIG. 2, and thus detailed descriptions thereof are omitted here.

The interface 340 may be used to receive a signal input LS2 from an external light sensor (second light sensor) 354 external to the image sensor 300. The external light sensor 354 may comprise, for example, a photoresistor. The processing module 330 of the image sensor 300 may determine the ambient light intensity based on the electrical signal LS1 output from the light sensor 320 and/or the electrical signal LS2 received through the interface 340, and control the operation of the image sensor 300 based on the determined ambient light intensity.

In one example, as shown in FIG. 8, the processing module 330 may include a multiplexer 336, a digital-to-analog converter (ADC) 332, and a controller 334. The multiplexer 336 may select the electrical signal LS1 output by the light sensor 320 or the electrical signal LS2 received through the interface 340 according to user's settings, for example. The ADC 332 can convert the selected electrical signal into a digital signal. The controller 334 may determine the ambient light intensity based on the digital signal, and output the control signals Ctr1 and Ctr2 based on the determined strength. The control signal Ctr1 can be used to control the external IR filter 350 to be turned off or on. The control signal Ctr2 may control the external compensation light source 352 to be turned off or turned on (i.e., enabled).

Such a configuration of the interface increases the compatibility and flexibility of the image sensor 300 in use.

In FIG. 8, a photosensitive element including a resistor R and a photoresistor is shown as an example of the external light sensor 354. It should be noted that there is no particular limitation on the external light sensor. It should also be noted that the embodiment shown in FIG. 8 is merely exemplary. In other implementations, the processing module 330 may also be configured to perform ambient light intensity determination based on both the electrical signal LS1 from the light sensor 320 and the electrical signal LS2 received through the interface 340 to obtain a more accurate result.

Figure 9:
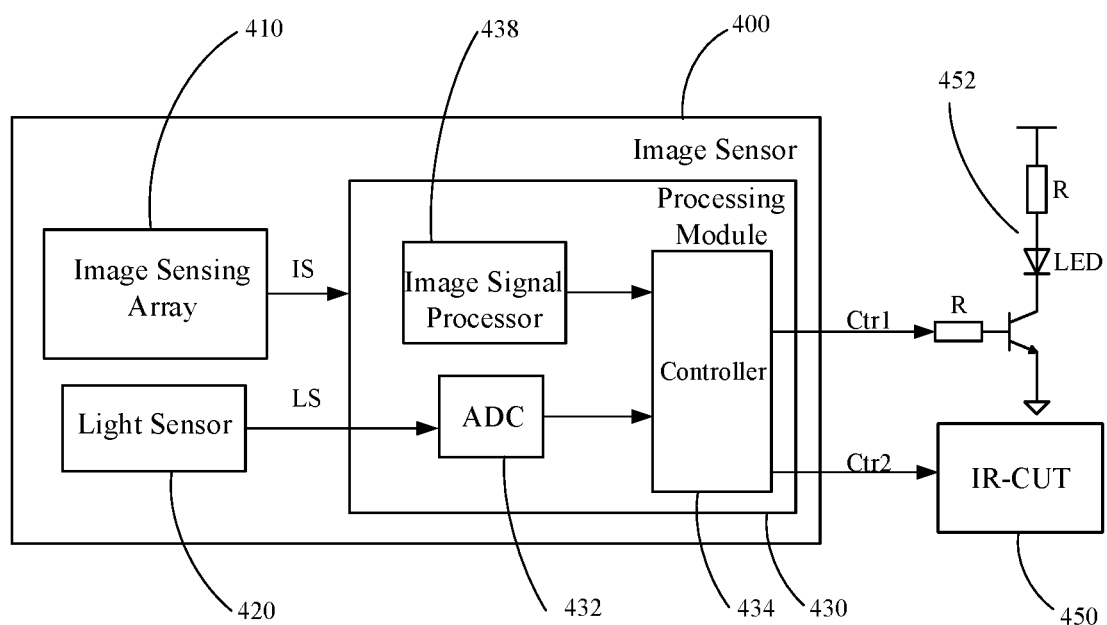
FIG. 9 shows a schematic diagram of an image sensor according to an embodiment of the present disclosure.

FIG. 9 shows a schematic diagram of an image sensor 400 according to an embodiment of the present disclosure. As shown in FIG. 9, the image sensor 400 includes an image sensing array 410, a light sensor 420, and a processing module 430. The image sensing array 410 and the light sensor 420 are similar to the corresponding components of the image sensor 100 shown in FIG. 2, and thus the description thereof is omitted here.

The processing module 430 of the image sensor 400 is configured to determine the ambient light intensity based on the electrical signal LS output from the light sensor 420, and control the operation of the image sensor 400 based on the determination of the ambient light intensity.

The processing module 430 may include a digital-to-analog converter (ADC) 432, a controller 434, and an image signal processor (or, a processing section) 438. The ADC 432 can convert the electrical signal LS from the light sensor 420 into a digital signal, and the image signal processor 438 can process the image signal IS sensed by the image sensing array 410. The controller 434 may determine the intensity of the ambient light based on the digital signal from the ADC 432, and output the control signals Ctr1 and Ctr2 based on the determination result. The control signal Ctr1 can be used to control the external infrared filter 450 to be turned off or on. The control signal Ctr2 may be used to control the external compensation light source 452 to be turned off or on.

The image signal processor 438 is configured to process the image signal IS sensed by the image sensing array 410. The processing module 430 may also include an automatic exposure control (AEC) unit. The automatic exposure control (AEC) unit can be implemented with hardware (for example, circuitry), software, or firmware. In some embodiments, the automatic exposure control unit AEC may be provided in the image signal processor 438 as shown in FIG. 9; however, the present disclosure is not limited thereto. In some embodiments, the automatic exposure control unit AEC may provide an additional indication signal to the controller based on the brightness of the image signal provided by the pixel array. The controller may perform control(s) based on the additional indication signal and the LS signal provided by the light sensor.

The imaging can be adjusted by the automatic exposure control (AEC) unit according to the ambient light intensity. For example, in the case of weak ambient light, the exposure time of the image sensing array may be increased through automatic exposure control; and in the case of strong ambient light, exposure of the image sensing array may be reduced through automatic exposure control time. As a result, the image quality can be improved.

Figure 10:
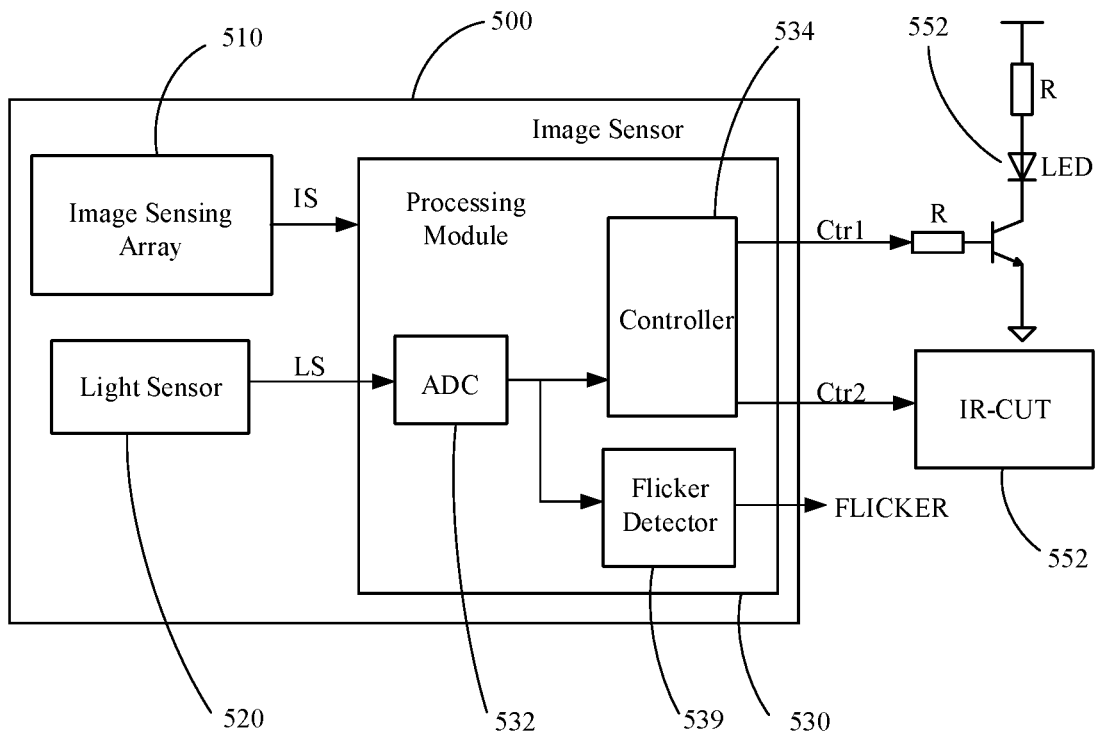
FIG. 10 shows a schematic diagram of an image sensor according to an embodiment of the present disclosure.

FIG. 10 shows a schematic diagram of an image sensor 500 according to an embodiment of the present disclosure. As shown in FIG. 10, the image sensor 500 includes an image sensing array 510, a light sensor 520, and a processing module 530. The image sensing array 510 and the light sensor 520 are similar to the corresponding components of the image sensor 100 shown in FIG. 2, and thus their description is omitted here.

The processing module 530 of the image sensor 500 is configured to determine the ambient light intensity and the ambient light flicker based on the electrical signal LS output from the light sensor 520, and control the operation of the image sensor 500 based on the determination result of the ambient light intensity and the ambient light flicker.

In another implementation, the processing module 530 may send the determination result to an external processor, and the external processor performs corresponding operation(s), such as turning off the infrared filter and/or turning on the LED to compensate the ambient light.

Similar to the processing module 230 shown in FIG. 7, the processing module 530 also includes a digital-to-analog converter (ADC) 532 and a controller 534. The difference is that the processing module 530 also includes a flicker detector (detection section) 539 that can detect flicker of ambient light. The flicker detector 539 receives from the ADC 532 a digital signal obtained by analog-to-digital conversion of the electrical signal LS output from the light sensor 520, and detects the flicker of the ambient light based on the digital signal.

In the processing module 530, the flicker detection can be performed simultaneously with the intensity detection, which can optimize the function integration of the image sensor, improve the operating efficiency, and reduce the resource consumption.

The sampling time of the light sensor 520 may be set to be independent of the exposure time (or corresponding sampling time) of the image sensing array 510. For example, the sampling time (or frequency) of the light sensor 520 may be set to be fixed to facilitate detection for a specific frequency of flicker, for example, detection of light flicker at a frequency (for example, 50 Hz or 60 Hz) of the power provided by the utility.

Compared with the conventional flicker detection, the ambient light flicker detection according to the embodiments of the present disclosure has many advantages. According to some embodiments of the present disclosure, since the amount of data collected by the light sensor is much smaller than the amount of the data collected by the image sensing array, the amount of data to be processed is greatly reduced, thereby greatly reducing design complexity and difficulty. In addition, since the sampling time of the light sensor is set independently from the image sensing array, the sampling time can be flexibly controlled, thereby extending the application range of the technical solutions disclosed in the present application. The decreasing in data volume to be processed and in design complexity results in a corresponding reduction in the area occupied by the designed circuit and greatly improves the detection efficiency.

In the image sensor 500, it is also possible to detect for flicker at different frequencies by, for example, configuring register settings. For example, ambient light scintillation at a particular frequency (e.g., 50 Hz, 60 Hz or higher) can be detected by configuring register(s), so that overall performance can be further optimized.

When the flicker detector 539 detects the flicker of the ambient light, the processing module 530 may control the automatic exposure control (AEC) unit to perform flicker cancellation according to the detection result. For example, the flicker detector 539 may directly feedback the detected flicker result to the image signal processing section or the AEC unit, and then compensate the sensed image signal according to the detection result, for example, to reduce or eliminate the flicker by adjusting the exposure time.

Alternatively, the flicker detector 539 can write the detection result into an internal status register for query by the host computer MCU or the ISP chip. Alternatively, the detection result can be output to a dedicated 10 pin FLICKER to notify the host MCU or ISP chip of the result.

Figure 11:
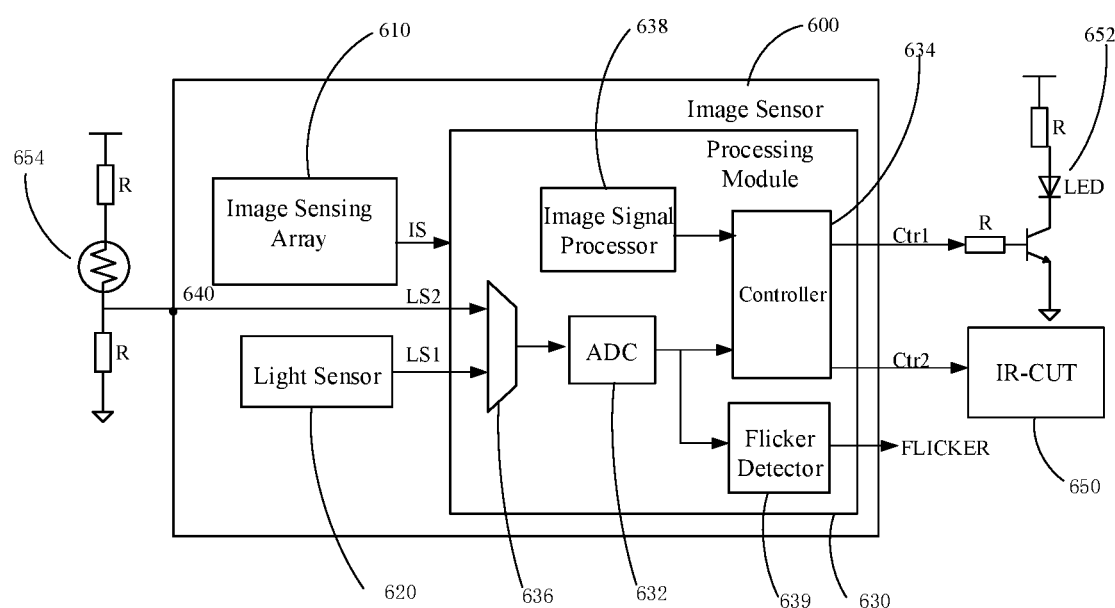
FIG. 11 shows a schematic diagram of an image sensor according to an embodiment of the present disclosure.

FIG. 11 shows a schematic diagram of an image sensor 600 according to an embodiment of the present disclosure. The image sensor 600 includes an image sensing array 610, a light sensor 620, an interface 640, and a processing module 630. The processing module 630 is configured to determine the ambient light intensity and the ambient light flicker based on the electrical signal LS output from the light sensor 620, and control the operation of the image sensor 600 based on the determination result of the ambient light intensity and the ambient light flicker.

The processing module 630 may include a multiplexer 636, a digital-to-analog converter (ADC) 632, a controller 634, an image signal processor 638, and a flicker detector 639. The multiplexer 636 may select the electrical signal LS1 output by the light sensor 620 or the electrical signal LS2 received from the external light sensor 654 through the interface 640, according to settings. The ADC 632 can convert the selected electrical signal into a digital signal. The image signal processor 638 may process the image signal IS sensed by the image sensing array 610, and in some implementations may assist the controller 634 in determining the ambient light intensity. The controller 634 may determine the ambient light intensity based on the digital signal (and assisted by the image signal processor 638 if needed), and output control signals Ctr1 and Ctr2 based on the determination result to control the external infrared filter 650 and compensation light source 652. The flicker detector 639 may detect flicker of the ambient light based on the digital signal received from the ADC 632. The description of the corresponding components of the other embodiments above may be similarly or adaptively applied to the corresponding components of the present embodiment, and thus the description thereof is omitted here.

The image sensor 600 according to the present embodiment can detect ambient light intensity and ambient light flicker simultaneously based on an on-chip integrated light sensor, and can detect ambient light intensity and ambient light flicker based on a signal received from an external light sensor (e.g., photoresistor) through an interface.

Figure 12B:
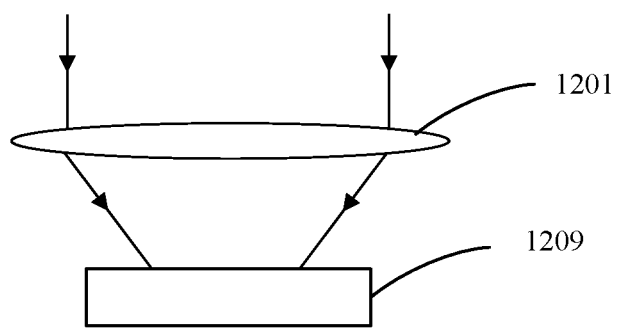

FIGS. 12A and 12B illustrate schematic views of arrangements of image sensors in imaging devices according to an embodiment of the present disclosure. FIG. 12A shows an arrangement of a pixel array 1203 for imaging and a light sensor 1205 of an image sensor 1207 and an optical member (e.g., lens) 1201. As described above, the light sensor 1205 may be provided as long as within the imaging range of the lens 1201 that cooperates with the image sensor 1207, and is preferably as close as possible to the imaging pixel array 1203. FIG. 12B schematically shows the arrangement of the cooperative lens 1201 and the image sensor 1209 in the imaging device. The image sensor 1209 can sense the light passing through the lens 1201 as shown by the arrow line in the figure.

It should be noted that the processing module according to various embodiments of the present disclosure can be implemented with hardware (for example, circuitry), software, or firmware. Thus, when appropriate, the processing module may often be termed as processing circuit.

The present disclosure can be widely applied to a variety of applications, including but not limited to, camera, security, surveillance, and other applications.

The various embodiments of the present disclosure have been described above, but the above descriptions are merely exemplary, not exhaustive, and the present disclosure shall not be limited to the disclosed various embodiments. The embodiments disclosed herein can be arbitrarily combined without departing from the spirit and scope of the present disclosure. Based on the teachings herein, one of ordinary skill in the related art can easily conceive of many modifications and variations that are also within the spirit and scope of the present disclosure. The scope of the invention is only defined by the appended claims.

What is claimed is:
1. An image sensor comprising:
an image sensing array on a semiconductor substrate for image sensing, the image sensing array comprising a plurality of first light sensing units arranged in an array;
a first light sensor on the substrate for sensing ambient light and converting the ambient light into a first electrical signal, the first light sensor comprising a plurality of second light sensing units arranged in an array, the second light sensing units being positioned external to the array of the first light sensing units; and
a processing circuit configured to determine an intensity of the ambient light based on the first electrical signal and control an operation of the image sensor based on the determined intensity,
wherein the second light sensing units are configured such that light sensing capability of the second light sensing units is higher than that of the first light sensing units.
2. The image sensor of claim 1, further comprising an interface for receiving a second electrical signal from an externally connected second light sensor, wherein the pro- cessing circuit is configured to determine the intensity of ambient light on basis of the first electrical signal and the second electrical signal.

3. The image sensor according to claim 1, wherein the processing circuit comprises a digital-to-analog converter (ADC) for converting the electrical signal(s) into digital signal(s) for determining the intensity of ambient light.

4. The image sensor of claim 1, wherein the processing circuit comprises an image signal processing circuit (ISP) for processing image signals sensed by the image sensing array.

5. The image sensor of claim 1, wherein controlling the operation of the image sensor comprises:
when the intensity is less than or equal to an threshold, the processing circuit processes the image signal sensed by the image sensing array in a black-and-white mode; and
when the intensity is above a threshold, the processing circuit processes the image signal sensed by the image sensing array in a color mode.

6. The image sensor of claim 1, wherein controlling the operation of the image sensor comprises one or more of the following:
the processing circuit turns off or turns on an infrared filter (IR-CUT) through a first control signal on basis of the intensity;
the processing circuit turns on/off an external light source for light compensation through a second control signal on basis of the intensity; and
an exposure time of the image sensing array is adjusted by automatic exposure control on basis of the intensity.

7. The image sensor of claim 1, wherein a sampling time of the first light sensing units is set to be independent of an exposure time or a sampling time of the second light sensing units.

8. The image sensor according to claim 7, wherein color filters are further provided over the first light sensing units, and no color filter is provided over the second light sensing units.

9. The image sensor according to claim 1, wherein the processing circuit comprises a flicker detector configured to determine a flicker of the ambient light based on the first electrical signal.

10. The image sensor according to claim 9, wherein the processing circuit is further configured to adjust the exposure time of the image sensing array by automatic exposure control based on the determined flicker.

11. The image sensor according to claim 1, wherein the first light sensor is disposed on the substrate within an imaging range of an optical member that cooperates with the image sensor,
the image sensor further comprises:
a first microlens on at least one of the first light sensing units, and
a second microlens on at least one of the second light sensing units,
wherein the second microlens may be shifted according to the position of the first light sensor in the imaging range such that light incident to at least one of the second light sensing units is converged to a light-sensing element in at least one of the second light sensing units.

12. An operation method for an image sensor, wherein the image sensor comprises an image sensing array on a semiconductor substrate for image sensing, the image sensing array comprising a plurality of first light sensing units arranged in an array; a first light sensor on the substrate, the first light sensor comprising a plurality of second light-sensing units arranged in an array, the second light-sensing units being positioned external to the array of the first light-sensing units,
wherein the second light sensing units are configured such that light sensing capability of the second light sensing units is higher than that of the first light sensing units,
the method comprises:
with the first light sensor, sensing ambient light and converting the ambient light into a first electrical signal;
determining an intensity of the ambient light based on the first electrical signal; and
controlling an operation of the image sensor based on the determined intensity.

13. The method of claim 12, wherein the image sensor further comprises:
an interface for receiving a second electrical signal from an externally connected second light sensor,
the method further comprising:
determining the intensity of ambient light based on the first electrical signal and the second electrical signal.

14. The method of claim 12, wherein controlling the operation of the image sensor comprises:
processing image signals sensed by the image sensing array in black-and-white mode when the intensity is less than or equal to a threshold; and,
processing the image signals sensed by the image sensing array in color mode when the intensity is higher than the threshold.

15. The method of claim 12, wherein controlling the operation of the image sensor comprises one or more of the following:
turning off/on an infrared filter on basis of the intensity;
turning on/off an external light source for light compensation on basis of the intensity; and
adjusting an exposure time of the image sensing array by automatic exposure control.

16. The method of claim 12, wherein a sampling time of the first light sensing units is set to be independent of an exposure time or a sampling time of the second light sensing units.

17. The method of claim 16, wherein color filters are formed over the first light sensing units, and no color filter is formed over the second light sensing units.

18. The method of claim 12, further comprising:
determining a flicker of the ambient light based on the first electrical signal; and
adjusting an exposure time of the image sensing array by an automatic exposure control based on the determined flicker.

19. The method of claim 12, wherein the first light sensor is disposed on the substrate within an imaging range of a lens that cooperates with the image sensor,
the image sensor further comprises:
a first microlens over at least one of the first light sensing units; and
a second microlens over at least one of the second light sensing units,
the method further comprising:
shifting the second microlens according to a position of the first light sensor in the imaging range such that light incident to at least one of the second light sensing units is converged to an light-sensing element in at least one of the second light sensing units.

20. An imaging device comprising:
an optical member, and
an image sensor of claim 1 for sensing light passing through the optical member.

* * * * *